US007889983B2

(12) United States Patent
Otsuka (10) Patent No.: US 7,889,983 B2
(45) Date of Patent: Feb. 15, 2011

(54) IMAGING APPARATUS WITH CAMERA-SHAKE CORRECTION FUNCTION, CAMERA-SHAKE CORRECTION DEVICE, AND CAMERA-SHAKE CORRECTION METHOD

(75) Inventor: Kouichi Otsuka, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 157 days.

(21) Appl. No.: 12/236,618

(22) Filed: Sep. 24, 2008

(65) Prior Publication Data

US 2009/0087174 A1 Apr. 2, 2009

(30) Foreign Application Priority Data

Sep. 28, 2007 (JP) .............................. 2007-254441

(51) Int. Cl.
*G03B 17/00* (2006.01)
*H04N 5/228* (2006.01)
(52) U.S. Cl. .................................... 396/55; 348/208.11
(58) Field of Classification Search .................. 396/55; 348/308.99, 208.4, 208.7, 208.11, 208.13
See application file for complete search history.

(56) References Cited

U.S. PATENT DOCUMENTS

2005/0024504 A1 2/2005 Hoshi
2005/0264656 A1 12/2005 Seo et al.
2007/0058049 A1 3/2007 Kawahara
2007/0077047 A1* 4/2007 Nomura et al. ................ 396/55
2007/0097219 A1* 5/2007 Nomura et al. .......... 348/208.7
2007/0122129 A1 5/2007 Sakamoto et al.
2008/0136949 A1 6/2008 Huang
2009/0009631 A1 1/2009 Hoshi

FOREIGN PATENT DOCUMENTS

| JP | 10-191144 A | 7/1998 |
| JP | 2001-183575 A | 7/2001 |
| JP | 2006-208702 A | 8/2006 |

OTHER PUBLICATIONS

Extended European Search Report dated Dec. 11, 2009 (9 pages), issued in counterpart European Application Serial No. 08016020.3.
Korean Office Action dated Dec. 15, 2009 and English translation thereof issued in a couterpart Korean Application No. 10-2008-0094146.

* cited by examiner

*Primary Examiner*—Rodney E Fuller
(74) *Attorney, Agent, or Firm*—Holtz, Holtz, Goodman & Chick, PC (57) ABSTRACT

When an image is photographed via a plurality of optical members which are disposed along a photographing optical axis, a direction and an amount of shake, which occurs, are detected. An imaging device is moved along a plane perpendicular to the photographing optical axis, on the basis of the detected direction and amount of shake. A position on the photographing optical axis of at least one of the optical members is corrected in accordance with data of the movement.

12 Claims, 7 Drawing Sheets

| X | Y | F LENS | Z LENS |
|---|---|---|---|
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |

| X | Y | DISTORTION CORRECTION | LIMB DARKENING CORRECTION |
|---|---|---|---|
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |

| A | X | Y |
|---|---|---|
| 1 | ... | ... |
| 2 | ... | ... |
| 3 | ... | ... |
| 4 | ... | ... |
| 5 | ... | ... |
| 6 | ... | ... |
| 7 | ... | ... |
| 8 | ... | ... |
| 9 | ... | ... |
| 10 | ... | ... |
| 11 | ... | ... |
| 12 | ... | ... |

IMAGING APPARATUS WITH CAMERA-SHAKE CORRECTION FUNCTION, CAMERA-SHAKE CORRECTION DEVICE, AND CAMERA-SHAKE CORRECTION METHOD

CROSS-REFERENCE TO RELATED APPLICATIONS

This application is based upon and claims the benefit of priority from prior Japanese Patent Application No. 2007-254441, filed Sep. 28, 2007, the entire contents of which are incorporated herein by reference.

BACKGROUND OF THE INVENTION

1. Field of the Invention

The present invention relates to a camera-shake correction function of an imaging apparatus.

2. Description of the Related Art

In the field of conventional digital cameras, such a technique has been thought that when camera-shake is detected, an imaging device is moved only in a direction perpendicular to a photographing optical axis in accordance with the direction of the detected camera-shake and the amount of the detected camera-shake, thereby capturing an image in which camera-shake is compensated.

BRIEF SUMMARY OF THE INVENTION

The object of the present invention is to make it possible to obtain a preferable photographic image come into focus even in a case where an imaging device has moved in parallel to an imaging optical axis due to camera-shake correction.

According to an aspect of the present invention, there is provided an imaging apparatus comprising: photographing means for photographing an image by an imaging device via a plurality of optical members which are disposed along a photographing optical axis; shake detection means for detecting a direction and an amount of shake; moving means for moving the imaging device or at least one of the optical members, which constitute the photographing means, along a plane perpendicular to the photographing optical axis, on the basis of the direction and the amount of shake which are obtained by the shake detection means; and correction means for correcting a position on the photographing optical axis of at least one of the optical members, which constitute the photographing means, in accordance with data of the movement of the imaging device by the moving means.

According to another aspect of the present invention, there is provided a shake correction device which is provided in an imaging apparatus which captures an image via a plurality of optical members which are disposed along a photographing optical axis, comprising: shake detection means for detecting a direction and an amount of shake; moving means for moving an imaging device, which is included in the imaging apparatus, along a plane perpendicular to the photographing optical axis, on the basis of the direction and the amount of shake which are obtained by the shake detection means; and correction means for correcting a position on the photographing optical axis of at least one of the plurality of optical members, in accordance with data of the movement of the imaging device by the moving means.

According to still another aspect of the present invention, there is provided a shake correction method for an imaging apparatus which photographs an image via a plurality of optical members which are disposed along a photographing optical axis, comprising: a shake detection step of detecting a direction and an amount of shake; a moving step of moving an imaging device, which is included in the imaging apparatus, or at least one of the plurality of optical members constituting the imaging apparatus, along a plane perpendicular to the photographing optical axis, on the basis of the direction and the amount of shake which are obtained by the shake detection step; and a correction step of correcting a position on the photographing optical axis of at least one of the plurality of optical members, in accordance with data of the movement of the imaging device which is moved by the moving step.

According to still another aspect of the present invention, there is provided a recording medium storing a program which is executed by a computer which is built in an imaging apparatus including a photographing unit which photographs an image by an imaging device via a plurality of optical members which are disposed along a photographing optical axis, the program causing the computer to execute: a shake detection process of detecting a direction and an amount of shake; a moving process of moving the imaging device or at least one of the plurality of optical members constituting the photographing unit, along a plane perpendicular to the photographing optical axis, on the basis of the direction and the amount of shake which are obtained by the shake detection process; and a correction process of correcting a position on the photographing optical axis of at least one of the plurality of optical members constituting the photographing unit, in accordance with data of the movement of the imaging device in the moving process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention, in which the invention is applied to a digital camera, will now be described with reference to the accompanying drawings.

(Structure)

Figure 1:
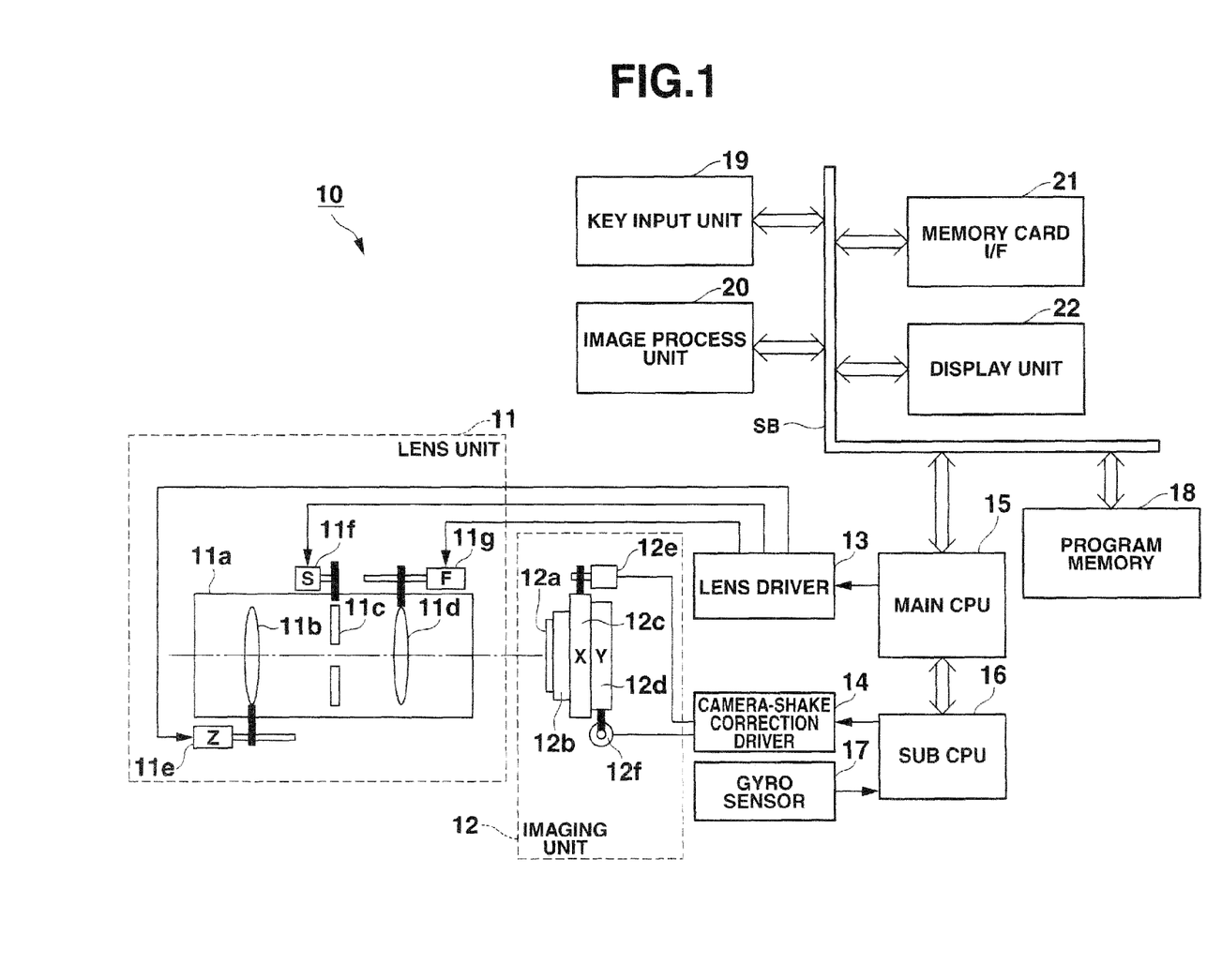
FIG. 1 is a block diagram showing in detail the structure of a photographing system as a main part of a digital camera according to an embodiment of the present invention.

FIG. 1 shows in detail the structure of a part of a digital camera 10, mainly a photographing system, according to the embodiment. In FIG. 1, reference numeral 11 denotes a lens unit functioning as an optical member. A zoom lens 11b, a mechanical shutter 11c and a focus lens 11d are arranged along a photographing optical axis within a lens barrel 11a.

The position of the zoom lens 11b is driven by a zoom lens motor 11e and is moved in a back-and-forth direction along the optical axis, and a photographing view angle, which is desired by a user, is obtained. The mechanical shutter 11c is driven by a shutter motor 11f and the opening/closing of the mechanical shutter 11c is controlled. The focus lens 11d is driven by a focus lens motor 11g, and is moved in the back-and-forth direction along the optical axis and set in an in-focus state.

An imaging unit 12 is disposed at a rear stage of the lens barrel 11a on the photographing optical axis. An infrared-cut filter 12a, a CCD 12b that is an imaging device, and an X stage unit 12c and a Y stage unit 12d, which perform camera-shake correction by moving the CCD 12b by detecting camera-shake, are integrally composed in the imaging unit 12.

The infrared-cut filter 12a cuts off an infrared component, which is out of the range of visible light, in the incident light to the CCD 12b. The CCD 12b is disposed on the X stage unit 12c. When camera-shake is compensated, the X stage unit 12c and Y stage unit 12d are moved in such a direction as to cancel the camera-shake. Thereby, the CCD 12b executes photographing at a correct light-receiving position. The movement of the X stage unit 12c is controlled by an X actuator 12e in an X axis direction which is perpendicular to the photographing optical axis ("Z axis"), and the movement of the Y stage unit 12d is controlled by a Y actuator 12f in a Y axis direction which is perpendicular to the photographing optical axis and to the X axis.

Each of the zoom lens motor 11e, shutter motor 11f and focus lens motor 11g of the lens unit 11 operates on the basis of the driving control by a lens driver 13.

Each of the X actuator 12e and Y actuator 12f of the imaging unit 12 operates on the basis of the driving control by a camera-shake correction driver 14.

The lens driver 13 is directly connected to a main CPU 15 which executes an overall control operation of the digital camera 10, and executes the operations in the lens unit 11.

The camera-shake correction driver 14 operates upon receiving a control instruction from a sub CPU 16 which is connected to the main CPU 15 and is a dedicated processor for an anti-shake operation. The sub CPU 16 receives a detection data from a gyro sensor 17 which detects the amount and direction of camera-shake occurring in three-dimensional directions.

A program memory 18, a key input unit 19, an image process unit 20, a memory card interface (I/F) 21 and a display unit 22 are connected to the main CPU 15 via a system bus SB.

The program memory 18 stores operation programs which are executed by the main CPU 15 and sub CPU 16 in the digital camera 10, and lookup tables 18a and 18b which will be described later.

The key input unit 19 is provided with, for instance, a power key, a shutter key, a photograph/playback mode key, a cursor key, a set key and a display key, and the key input unit 19 sends key code signals corresponding to the key operations to the main CPU 15.

The shutter key has two-step operation strokes. In the first-step operation stroke, that is, in a so-called "half-press" state, the shutter key executes AF (auto-focus) and AE (auto-exposure) processes and locks the AF and AE. In the second-step operation stroke to which the half-pressed key is further pressed, that is, in a so-called "full-press" state, the shutter key executes photographing under the photographing conditions of the locked AF and AE.

The image process unit 20 executes data processes relating to various image data. For example, the image process unit 20 processes an image which is to be monitor-displayed on the display unit 22 at a time of a photographing mode, compresses image data, which is photographed at a time of photographing, by a predetermined data format such as the JPEG (Joint Photographic Experts Group) standard, or decompresses image data which is selected at a time of a playback mode.

The memory card interface 21 executes data transmission/reception between a memory card which is detachably attached to the digital camera 10 as a recording medium, and the image process unit 20.

The display unit 22 comprises a backlight-equipped color liquid crystal panel, which is provided on the back side of the digital camera 10, and a driving circuit for driving the liquid crystal panel. At the time of the photographing mode, an image, which is focused by the CCD 12b at that time, is monitor-displayed. At the time of the playback mode, image data, which is read out from the memory card (not shown) via the memory card interface 21, is played back and displayed.

(Operation)

Next, the operation of the above-described embodiment is described.

Figure 2:
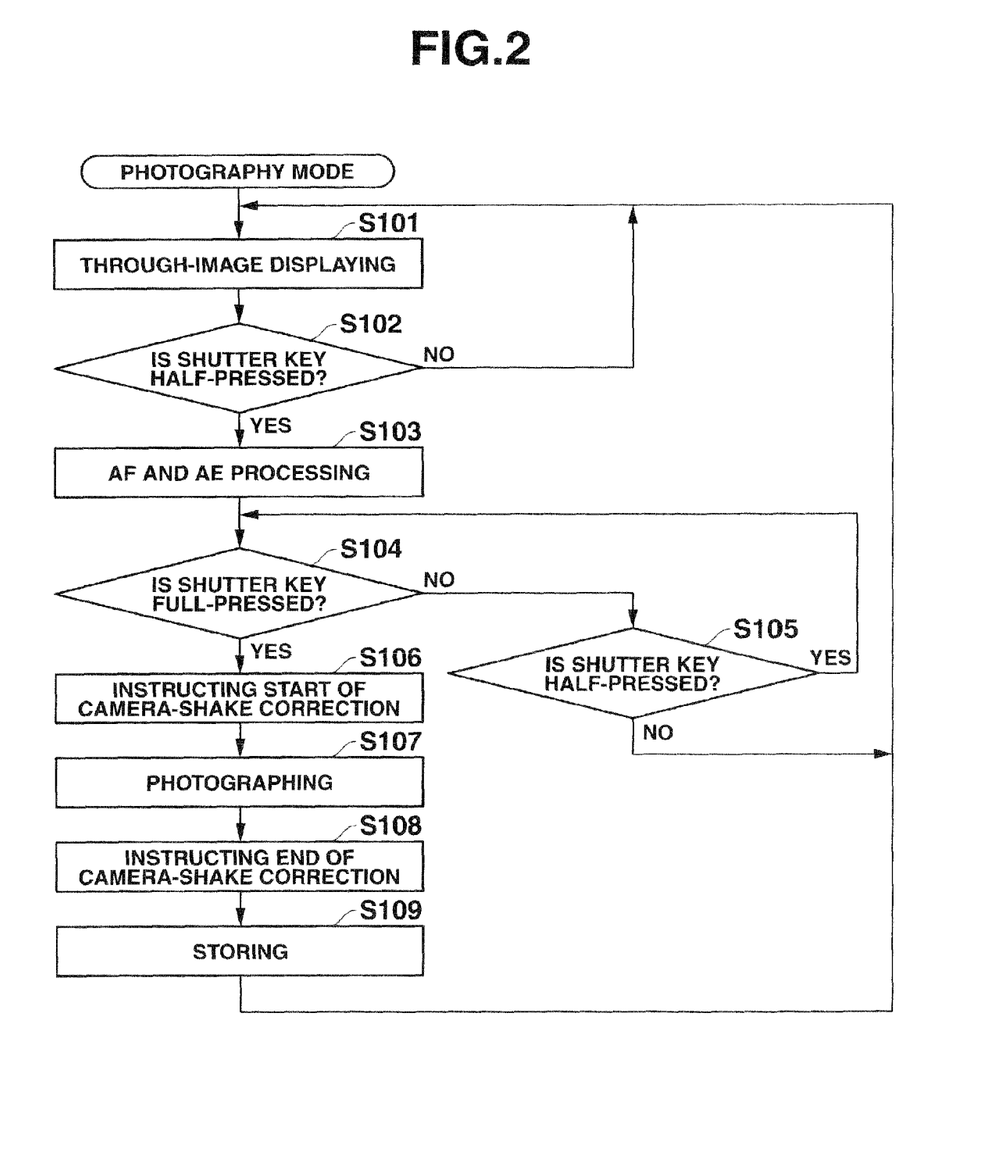
FIG. 2 is a flow chart illustrating the content of a process at a time of a photography mode in a state in which a camera-shake correction function according to the embodiment of the invention is enabled.

FIG. 2 illustrates the operation at the time of the photographing mode in which a camera-shake correction function is enabled. This operation is performed when the main CPU 15 executes operation control on the basis of the operation program and other fixed data, which are read out from the program memory 18.

To start with, the CCD 12b is driven with a predetermined frame rate, e.g. at a rate of 30 frames/sec., and periodically obtained image data are through-displayed on the display unit at each time (step S101). In this state, it is determined whether the shutter key of the key input unit 19 is half-pressed (step S102). In the process of step S102, if it is determined that the shutter key is not half-pressed, the process returns to step S101, and this process is repeatedly executed. By this repeated process, half-pressing of the shutter key is awaited while the through-display is being performed.

If the shutter key is half-pressed, this state is determined in the above-described step S102. At this time point, an AF process is executed. In the AF process, the focus lens 11*d* of the lens unit 11 is moved by the focus lens motor 11*g* in the back-and-forth direction along the photographing optical axis, and a focus position at which the image data obtained by the CCD 12*b* has a highest contrast is detected. Subsequently, an AE process is executed to determine a diaphragm stop value F and a shutter speed S at this AF position, on the basis of an EV (Exposure Value) according to a preset program diagram, and to lock the AF position and the AE value (step S103).

Subsequently, it is repeatedly determined whether the shutter key of the key input unit 19 is full-pressed or not (step S104), or whether the shutter key is still half-pressed or not (step S105). Thereby, standby for the full-press of the shutter key and confirmation of the half-press operation are performed.

If the half-press operation of the shutter key is released, this state is determined in step S105. After the lock of the AF position and AE value is released, the process returns to step S101.

If the full-press is determined in step S104, this means that the user of the camera has instructed photographing. Thus, the start of a camera-shake correction operation, which is mainly executed by the sub CPU 16, is instructed (step S106), and photographing is executed with the AF position and AE value, which are locked in the preceding step S103 in accordance with the full-press operation of the shutter key (step S107).

Then, the photographing is finished and the image data from the CCD 12*b* under the set photographing conditions is acquired. The acquired image data is sent to the image process unit 20 and subjected to an image process for necessary data compression. Further, the end of the camera-shake correction operation is instructed to the sub CPU 16 (step S108).

Thereafter, an image data file after data compression, which is obtained from the image process unit 20, is stored in a memory card (not shown) via the memory card interface 21 (step S109). The series of photographing processes are thus completed, and the process returns to step S101 in preparation for the next photographing.

Figure 3:
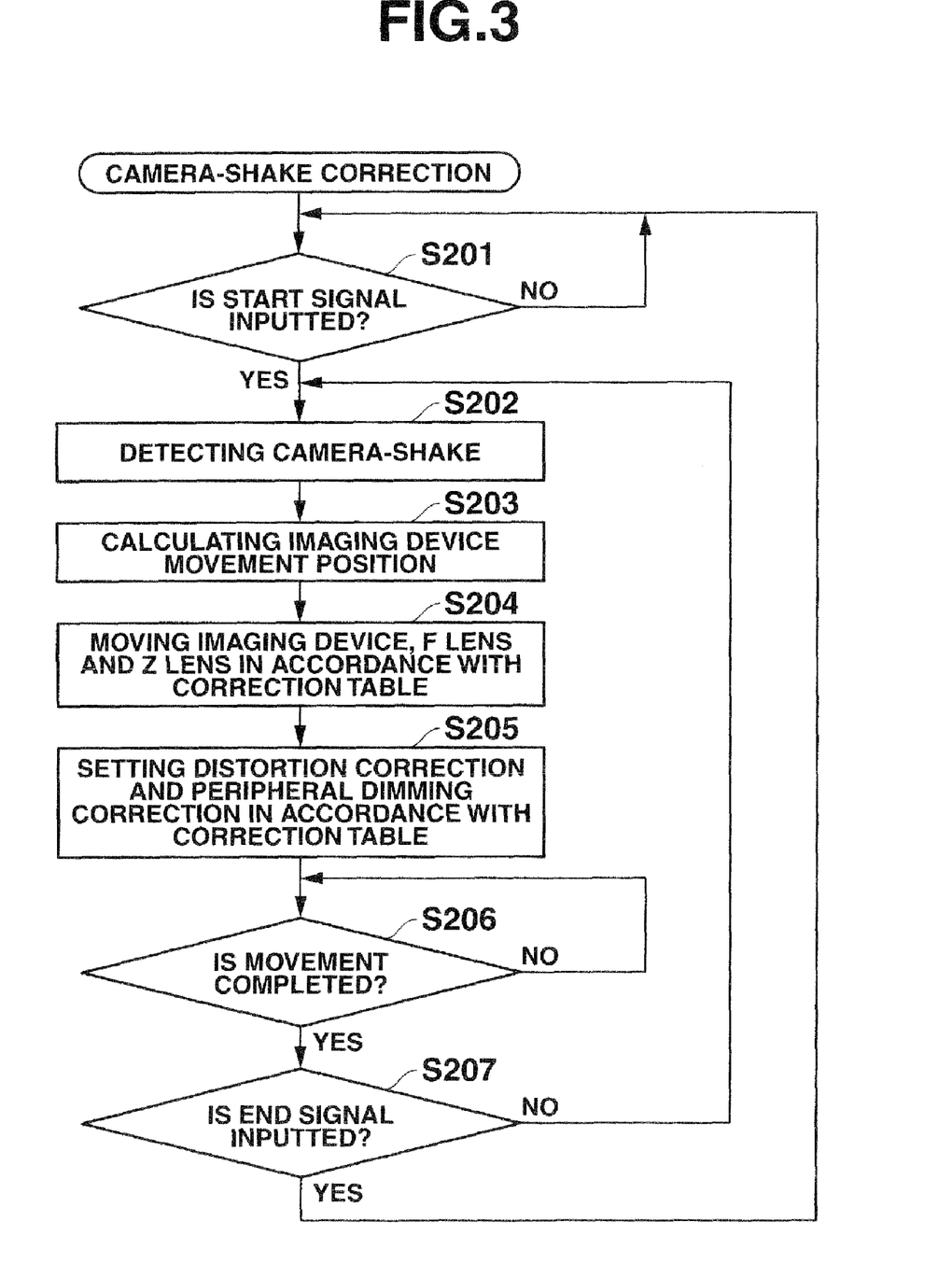
FIG. 3 is a flow chart illustrating the content of a camera-shake correction process according to the embodiment of the invention, which is executed in parallel with a part of the process illustrated in FIG. 2.

FIG. 3 illustrates the content of a camera-shake correction process which is executed by the sub CPU 16 in parallel with the process of FIG. 2 under the control of the main CPU 15. To start with, the sub CPU 16 repeatedly determines whether a signal instructing the start of camera-shake correction has been input from the main CPU 15, thereby awaiting the input of the signal (step S201).

If the main CPU 15 issues, in the above-described step S106, the signal instructing the start of camera-shake correction, the sub CPU 16 determines in step S201 that this signal has been input, and receives an output of the gyro sensor 17 so as to detect the direction and amount of camera-shake that occurs (step S202).

Next, on the basis of the output of the gyro sensor 17, a calculation is performed for a movement position (amounts of movements in the X and Y axis directions from the starting position) which compensates camera-shake in the CCD 12*b* of the imaging unit 12 in the X axis direction and Y axis direction along the two-dimensional XY plane perpendicular to the photographing optical axis, which particularly affects the photographing (step S203).

On the basis of the movement amounts in the X and Y axis directions which are obtained by this calculation, the camera-shake correction driver 14 controls the driving of the X actuator 12*e* and Y actuator 12*f*, and moves the CCD 12*b*.

On the other hand, on the basis of the respective movement amounts, the sub CPU 16 refers to the lookup table 18*a* which is stored in the program memory 18, and reads out correction amounts of the positions of the focus lens 11*d* and zoom lens 11*b*, which are set at that time point. In accordance with the read-out correction amounts, the positions of the respective lenses are moved and corrected by the focus lens motor 11*g* and shutter motor 11*f* via the main CPU 15 and lens driver 13 (step S204).

Figure 4:
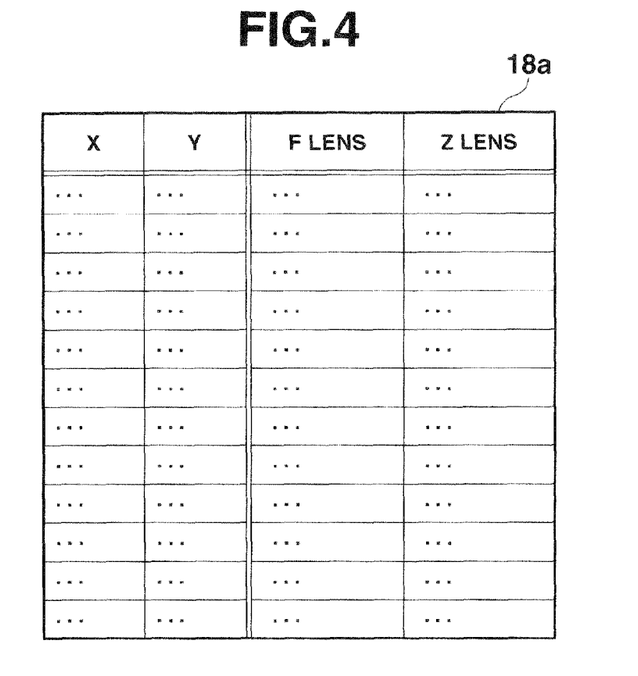
FIG. 4 shows a lookup table 18a according to the embodiment of the invention, showing correction amounts of a focus lens and a zoom lens, which correspond to a movement position of a CCD.

FIG. 4 shows, by way of example, the form of the lookup table 18*a* which is referred to by the sub CPU 16 at this time. Since the CCD 12*b* is slightly displaced in the direction parallel to the photographing optical axis in accordance with the movement of the CCD 12*b* in the X and Y axis directions perpendicular to the photographing optical axis by the movement of the X stage unit 12*c* and Y stage unit 12*d*, it is considered that the amount of displacement in the Z axis direction is constant in relation to the amounts of movements in the X and Y axis directions.

Thus, by a setting method that will be described later, the lookup table 18*a*, as shown in FIG. 4, is prestored in the program memory 18. The positions of the focus lens 11*d* and zoom lens 11*b*, which correspond to the movement position of the CCD 12*b*, are read out of the lookup table 18*a*, and the driving positions at that time point are corrected. Thereby, the respective positions are properly moved so as to compensate the Z-axis displacement of the CCD 12*b* and to keep the normal focus position and zoom view angle.

Then, similarly, on the basis of the movement amounts in the X and Y axis directions, the sub CPU 16 refers to the lookup table 18*b* that is stored in the program memory 18, reads out parameter values for distortion correction and limb darkening correction, which are image processes for the image data obtained by the photographing, and sends the parameter values to the image process unit 20 (step S205).

Figure 5:
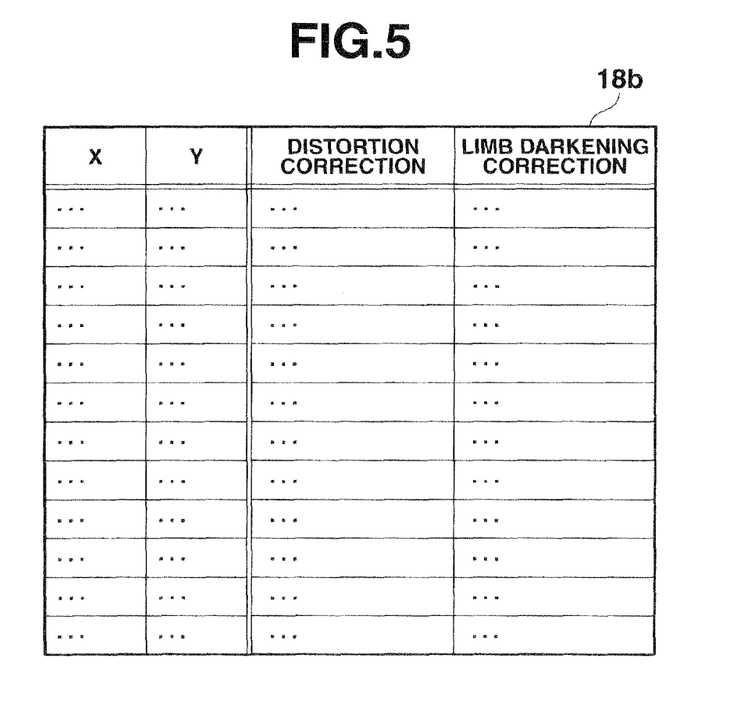
FIG. 5 shows a lookup table 18b according to the embodiment of the invention, showing amounts of distortion correction and limb darkening correction, which correspond to a movement position of a CCD.

FIG. 5 shows, by way of example, the form of the lookup table 18*b* which is referred to by the sub CPU 16 at this time. The focus lens 11*d* and zoom lens 11*b* are slightly displaced in the direction parallel to the photographing optical axis in accordance with the movement of the CCD 12*b* in the X and Y axis directions perpendicular to the photographing optical axis by the movement of the X stage unit 12*c* and Y stage unit 12*d*. It is considered that the amount of displacement in the Z axis direction is constant in relation to the amount of movement of the CCD 12*b* in the X and Y axis directions.

Thus, by a setting method that will be described later, the lookup table 18*b*, as shown in FIG. 5, is prestored in the program memory 18. The parameter values for distortion correction and limb darkening correction are read out in accordance with the amount of movement of the CCD 12*b*. Thereby, distortion of image data obtained by photographing and non-uniformity in light amount distribution are compensated.

In this structure example, step S205 is executed after step S204. Alternatively, step S204 and step S205 may be executed at the same time, or step S204 may be executed after step S205 in a reverse order.

Compared to the time that is needed for physically moving, e.g. the imaging device and lenses, the time that is needed for making software-like alterations such as distortion correction and limb darkening correction can easily be reduced. Therefore, more naturally appearing control can advantageously be executed by first executing step S204, rather than first executing step S205.

More preferably, step S204 and step S205 should be executed at the same time. That is, more naturally appearing control can be executed if the above-described software-like alternations are performed during the above-described physical movement.

Further, still more naturally appearing control can be executed if the software-like alternations in step S205 are performed as continuously (smoothly) as possible, rather than in a stepwise manner.

Then, after the completion of the movement of the focus lens 11d and zoom lens 11b, the movement of which is instructed in step S204, is confirmed (step S206), it is determined whether a signal instructing the end of the camera-shake correction is input from the main CPU 15 (step S207). If this signal is not input, the process returns to the above-described step S202.

By repeatedly executing the process of steps S202 to S207 until the signal instructing the end of the camera-shake correction is input from the main CPU 15, the CCD 12b is always moved in the plane perpendicular to the photographing optical axis in accordance with the direction and amount of camera-shake occurring at that time point.

At the same time, the positions of the focus lens 11d and zoom lens 11b are exactly compensated in accordance with the displacement in the photographing optical axis direction, and the distortion correction and limb darkening correction are executed as the image process corresponding to the displacement of the zoom lens 11b in the photographing optical axis direction.

If the signal instructing the end of the camera-shake correction is input from the main CPU 15, this is determined by the sub CPU 16 in step S201, and the process is returned to step S201 in preparation for the next camera-shake correction.

As has been described above, according to the present embodiment, even in the case where the CCD 12b is displaced in the photographing optical axis direction by the movement of the CCD 12b functioning as the imaging device due to the camera-shake correction, this displacement can exactly be compensated, and as a result, a preferable photograph image come into focus can be obtained.

Specifically, in addition to the movement of the CCD 12b that is the imaging device, the positions of the focus lens 11d and zoom lens 11b constituting the lens unit 11 are corrected.

Accordingly, the correct in-focus state can be maintained by correcting the position of the focus lens 11d, and the photographing view angle, which is intended by the photographer, can be maintained by correcting the position of the zoom lens 11b, and thereby the photographing can be executed.

The positions of other optical members of the lens unit 11, for example, the mechanical shutter 11c and diaphragm, may be corrected, and an exact image based on the characteristics of these optical members can be photographed.

The position (movements amounts) of the focus lens 11d and zoom lens 11b of the lens unit 11, which is the optical member, are acquired in accordance with the movement data of the CCD 12b with reference to the preset lookup table 18a. Therefore, without executing complex arithmetic operations at each time, the positions of the focus lens 11d and zoom lens 11b can exactly and quickly corrected, contributing greatly to the follow-up performance and responsivity of the camera-shake correction function which is adopted in the digital camera.

In the present embodiment, the predetermined image process in the image process unit 20 for the image data obtained by the CCD 12b is corrected in accordance with the movement data of the CCD 12b.

Specifically, in the case where the CCD 12b is displaced also in the photographing optical axis direction due to the camera-shake correction, the position of the optical member is corrected as described above. The factor of image quality degradation, which is not completely compensated by only the physical positional correction and is reflected on the image data, is compensated at the stage of the image process.

Specifically, in order to compensate the image distortion and limb darkening due to the displacement of the CCD 12b not only in the plane perpendicular to the photographing optical axis but also in the photographing optical axis, the above-described image correction process, together with the data compression process, is executed in the image process unit 20 prior to the recording of image data.

Thereby, vertical lines and horizontal lines, which constitute a normally linear subject in an image, are not unnaturally distorted. In addition, it is possible to exactly compensate a decrease in light amount of an image peripheral part, compared to a subject in a central part of the image, which results in a dark image, and to obtain and record image data as intended by the user.

In the image process, the parameter values, which are used for the distortion correction and limb darkening correction, are acquired by referring to the lookup table 18b which is preset in the program memory 18. Therefore, without executing complex arithmetic operations at each time, each image process can exactly and quickly be corrected, and the time that is needed for recording photographed image data can greatly be reduced, thus being able to prepare for the next photographing.

(Presetting)

Next, a description is given of a presetting operation for each individual digital camera 10, which is executed before factory shipment in order to prestore the lookup tables 18a and 18b, shown in FIG. 4 and FIG. 5, in the program memory 18.

Specifically, the above-described displacement in the photographing optical axis direction which occurs when the CCD 12b is moved in the plane perpendicular to the photographing optical axis, the movement amounts of the focus lens 11d and zoom lens 11b for compensating the displacement, and the parameter values for the distortion correction and limb darkening correction at the time of the image process are all greatly influenced by the correlation of errors between the individual members that constitute the digital camera 10. These parameter values depend greatly on the individual difference of the digital camera 10. Thus, the parameter values cannot uniformly be set regardless of the individual difference. It is necessary, therefore, to perform a setting operation, as described below, with respect to each individual digital camera 10.

Figure 6:
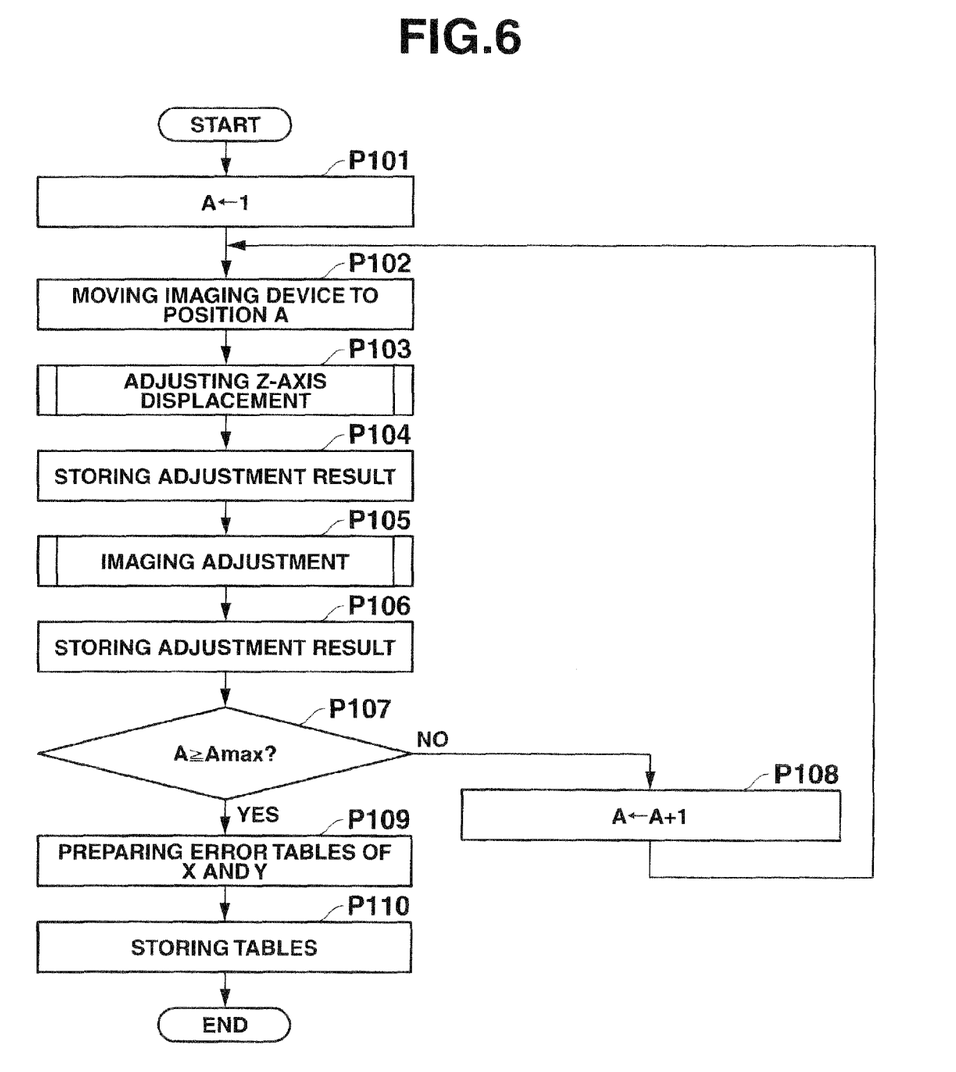
FIG. 6 is a flow chart illustrating a presetting process for storing lookup tables prior to shipment, according to the embodiment of the invention.

FIG. 6 illustrates the presetting process for storing the lookup tables 18a and 18b shown in FIG. 4 and FIG. 5, which is executed by the main CPU 15 and sub CPU 16 with respect to each individual digital camera 10 prior to factory shipment.

Needless to say, if the condition for equipment is met, this presetting process may be performed after factory shipment, for example, after repair.

A set program for performing the presetting process is stored in the program memory 18, and the set program can be started by inputting special code information to the main CPU 15.

To start with, an initial value "1" is set for a variable A which is indicative of the movement position of the CCD 12b (step P101).

Figure 9:
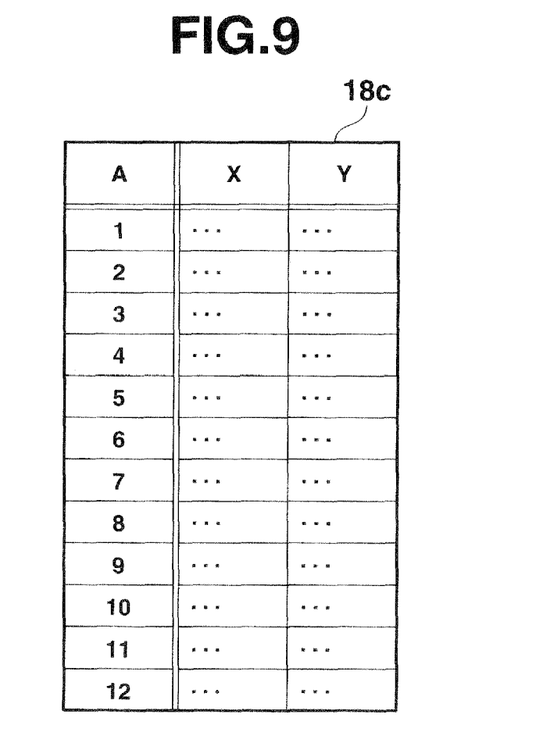
FIG. 9 shows a lookup table 18c showing the correspondency between a variable A in FIG. 6 and the associated movement amounts of the CCD, according to the embodiment of the invention.

FIG. 9 shows a table 18c of combinations of movement amounts in the X axis direction and Y axis direction of the CCD 12b in association with the variable A. The table 18c is also stored in the program memory 18. By setting the value of the variable A, the corresponding movement amounts in the X axis direction and Y axis direction are read out from the table 18c, and the X stage unit 12c and Y stage unit 12d can be moved to the corresponding position by the X actuator 12e and Y actuator 12f of the imaging unit 12.

If the CCD 12b is moved to the position indicated by the variable A (step P102), the adjustment corresponding to the displacement in the direction parallel to the photographing optical axis (Z axis), which occurs at this movement position, is executed. Specifically, the positional adjustment of the focus lens 11d and zoom lens 11b is executed (step P103).

Figure 7:
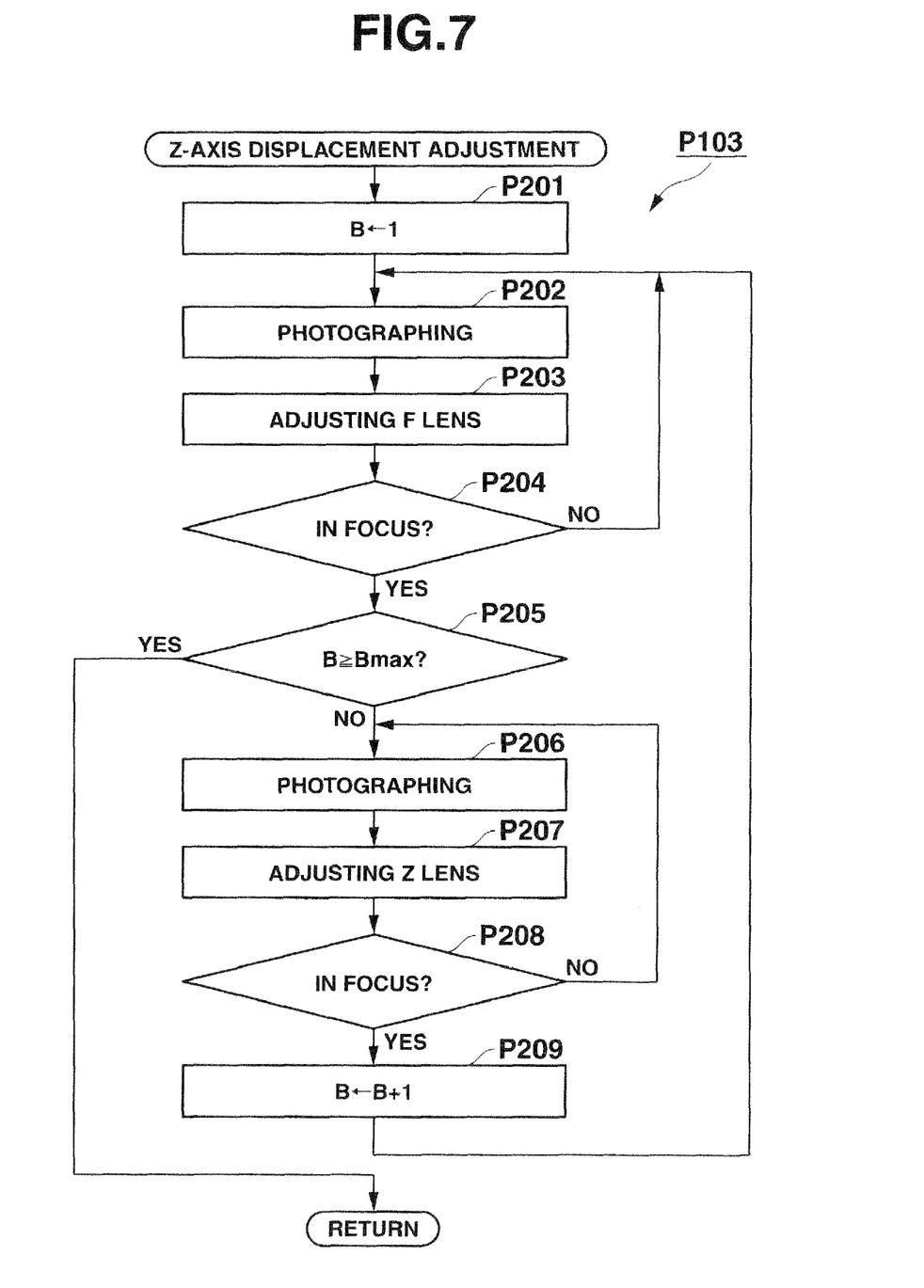
FIG. 7 is a flow chart illustrating the content of a process of a sub-routine of Z-axis adjustment illustrated in FIG. 6, according to the embodiment of the invention.

FIG. 7 shows a sub-routine of this step P103. To begin with, a variable B, which is indicative of the number of times of repetition of displacement adjustment, is set at an initial value "1" (step P201).

Next, in the state in which the CCD 12b is moved, a photographing operation for photographing a pre-prepared test chart image is executed (step P202). Then, the position of the focus lens 11d is adjusted on the basis of the contrast of the obtained image (step P203). On the basis of whether the contrast is a predetermined contrast or not, it is determined whether an in-focus state is attained or not (step P204).

If it is determined that the in-focus state is not attained, the process from step P202 is repeatedly executed until it is determined that the in-focus state is attained.

If it is determined that the in-focus state is attained, the process advances to an adjustment process for the zoom lens 11b, upon confirming that the value of the variable B at this time point does not reach a maximum value Bmax, e.g. "10" (step P205).

In the adjustment process for the zoom lens 11b, like the case of the focus lens 11d, a photographing operation for a pre-prepared test chart image is executed in the state in which the CCD 12b is moved, (step P206). The position of the zoom lens 11b is adjusted on the basis of the size of the test chart image in the obtained image (step P207). On the basis of whether the size is a predetermined size or not, it is determined whether the zoom view angle is a correct one or not (step P208).

If it is determined that the size is not the predetermined size, the process from the above-described step P206 is repeatedly executed until it is determined that the size is the predetermined size.

If it is determined that the size of the test chart image in the photographed image is the predetermined size, it is determined that the adjustment of the focus lens 11d becomes necessary once again due to the adjustment of the zoom lens 11b, and the value of the variable B is updated by "+1" (step P209). Then, the process returns to step P202.

In this manner, in accordance with the movement position of the CCD 12b that is indicated by the variable A, the adjustment of the focus lens 11d, the adjustment of the zoom lens 11b and the re-adjustment of the focus lens 11d are repeatedly executed by a number of times, which is represented by the maximum value Bmax of the variable B. Thereby, with the priority being placed on the focus position by the focus lens 11d, the position of the focus lens 11d and the position of the zoom lens 11b are gradually adjusted and brought to correct positions.

After the above-described adjustment is executed by the number of times that is represented by the maximum value Bmax of the variable B, this state is determined in the above-described step P205. Thus, the adjustment of the focus lens 11d and zoom lens 11b by the sub-routine of FIG. 7 is completed, and the process is returned to the main routine of FIG. 6.

In FIG. 6, after the Z-axis displacements of the focus lens 11d and zoom lens 11b are adjusted in step P103, the adjustment result is stored (step P104), and image adjustment relating to the image process by the image process unit 20 is executed (step P105).

Figure 8:
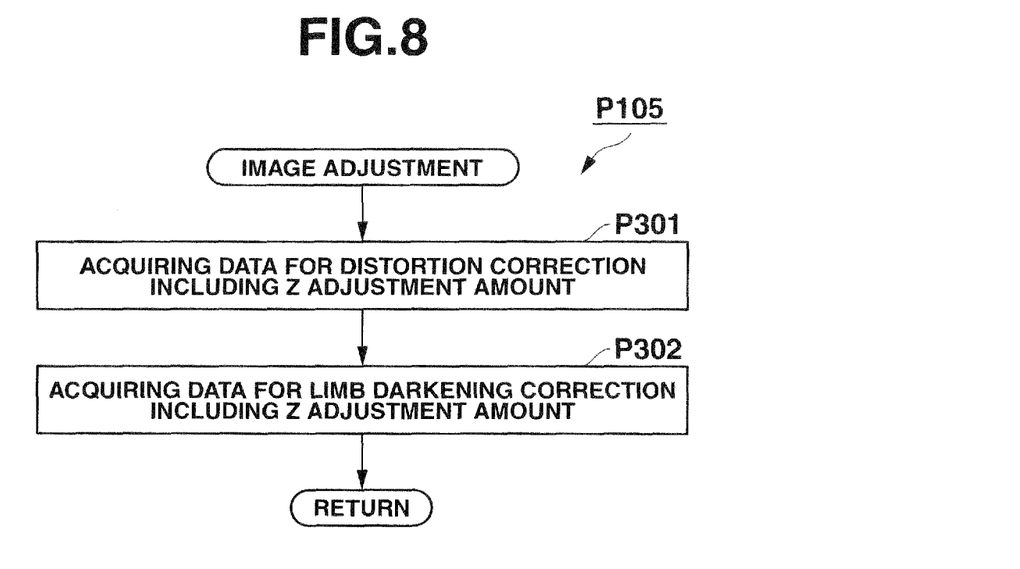
FIG. 8 is a flow chart illustrating the content of a process of a sub-routine of image quality adjustment illustrated in FIG. 6, according to the embodiment of the invention.

FIG. 8 illustrates a sub-routine relating to the image quality adjustment of this step P105. A parameter value for the distortion correction including a Z-axis adjustment amount is calculated from the test chart image in the photographed image using the correction values of the focus lens 11d and zoom lens 11b stored in the immediately preceding step P104 (step P301).

In short, this means that the image adjustment of step P105 is executed at the positions of the F lens and Z lens, which are adjusted in step P205. This parameter value can uniquely be calculated by finding a position with distortion from the positions of a plurality of measurement points in a rectangular shape for distortion correction, which are included in advance in the test chart image, and by calculating the amount thereof.

Then, similarly, a parameter value for the limb darkening correction including a Z-axis adjustment amount is calculated from the test chart image In the photographed image using the correction values of the focus lens 11d and zoom lens 11b stored in the immediately preceding step P104 (step P302).

Similarly, this means that the image adjustment of step P105 is executed at the positions of the F lens and Z lens, which are adjusted in step P205. This parameter value can uniquely be calculated by comparing a luminance value at a central part of the test chart image and luminance values at plural points on the peripheral part.

If the parameter values for the distortion correction and the limb darkening correction are calculated, the image quality adjustment by the sub-routine in FIG. 8 is completed, and the process returns to the main routine of FIG. 6.

In FIG. 6, after the end of the image quality adjustment in step P105 of the distortion correction and limb darkening correction for the Z-axis displacements, the adjustment result is stored (step P106). It is determined whether the value of the variable A at this time point exceeds a maximum value Amax or not, and thereby it is determined whether the adjustment results corresponding to all movement positions of the CCD 12b have been stored (step P107).

If it is determined that the value of the variable A does not exceed the maximum value Amax and there are other movement positions at which adjustment is to be executed by updating the value of the variable A, the value of the variable A is updated by "+1" (step P108), and the process returns to step P102.

In this manner, the movement position of the CCD 12b, which is indicated by the variable A, is successively updated and set, and similarly the adjustment positions of the focus lens 11d and zoom lens 11b, as well as the adjustment amounts for the distortion correction and limb darkening correction in the image process, are accumulated.

Thus, by repeatedly executing the above-described process at all movement positions of the CCD 12b which are indicated by the variable A, the adjustment amounts corresponding to the individual difference of the digital camera 10 have successively been calculated on the basis of the stored results.

At the time point when the value of the variable A reaches the maximum value Amax, this state is determined in step P107, and the lookup tables 18a and 18b shown in FIG. 4 and FIG. 5 are prepared from the stored results of adjustment amounts (step P109), and the prepared lookup tables 18a and 18b are stored in the program memory 18 (step P110). The presetting process in FIG. 6 is thus completed.

As has been described above, the correction positions of the focus lens 11d and zoom lens 11b functioning as optical members, which correspond to the movement position of the CCD 12b that is the imaging device, are detected, and the lookup table 18a shown in FIG. 4 is prepared and stored. Thereby, the exact position correction amounts in the lens unit 11, which correspond to the individual difference of the digital camera 10, can be obtained, and a more exactly focused image at a photographing view angle, which is intended by the user, can be photographed.

Similarly, the correction parameter values for the distortion correction and limb darkening correction in the image process, which correspond to the movement positions of the CCD 12b that is the imaging device, are detected, and the lookup table 18b shown in FIG. 5 is prepared and stored. Thereby, the various image processes in the image process unit 20 can be executed so as to compensate the individual difference of the digital camera 10, and degradation of the image quality, which cannot physically be compensated by the optical system, can be corrected at the stage of the image process.

In the above-described embodiment, the CCD is used as the imaging device of the digital camera 10. In the present invention, however, the imaging device is not limited, and the invention is similarly applicable to the case of using a CMOS image sensor. In addition, the invention is similarly applicable to the case of using such an imaging device as to be able to absorb different color light in accordance with the depth of a layer in one pixel of silicon, to which light can reach, and to recognize different colors.

The above-described embodiment relates to the case in which the imaging device is moved in the plane perpendicular to the photographing optical axis, thereby to carry out camera-shake correction. In addition, the invention is similarly applicable to the case in which lenses, which are other optical members on the photographing optical axis, are moved. In this case, since the relative displacement is large, the advantageous effect by the correction becomes greater.

In the above-described embodiment, the camera-shake correction is executed by driving the imaging device. It is stressed again, however, that the invention is applicable to lens-driving type camera-shake correction which is executed by driving an optical member for camera-shake correction.

In the description of the present embodiment, the shake compensation is limited to the camera-shake correction. Alternatively, the present invention is applicable to subject-shake compensation in which shake of a subject is detected and the subject-shake is compensated by driving the imaging device or the optical member for shake correction.

It is also possible to adopt a structure including both camera-shake detection means and subject-shake detection means, wherein the imaging device or the optical member for shake compensation is driven in consideration of both detections, and the shake compensation is executed by taking both camera-shake and subject-shake into account.

The present invention is not limited to the above-described embodiment. In practice, various modifications may be made without departing from the spirit of the invention. The functions, which are executed in the above-described embodiment, may be properly combined and practiced as much as possible. The above-described embodiment includes inventions in various stages, and various inventions can be derived from proper combinations of structural elements disclosed herein. For example, even if some structural elements in all the structural elements disclosed in the embodiment are omitted, if advantageous effects can be achieved, the structure without such structural elements can be derived as an invention.

What is claimed is:

1. An imaging apparatus comprising:
    photographing means for photographing an image by an imaging device via a plurality of optical members which are disposed along a photographing optical axis;
    shake detection means for detecting a direction and an amount of shake;
    moving means for moving the imaging device along a plane perpendicular to the photographing optical axis based on the direction and the amount of shake detected by the shake detection means; and
    correction means for correcting a position along the photographing optical axis of at least one of the optical members of the photographing means, in accordance with data of the movement of the imaging device by the moving means.

2. The imaging apparatus according to claim 1, wherein the optical members include a focus lens which shifts a focus position, and wherein the correction means corrects a position of the focus lens.

3. The imaging apparatus according to claim 1, wherein the optical members include a zoom lens which varies a photographing view angle, and wherein the correction means corrects a position of the zoom lens.

4. The imaging apparatus according to claim 1, further comprising first memory means for storing the position which is corrected by the correction means in accordance with the data of the movement of the imaging device by the moving means,
    wherein the correction means reads out the position, which corresponds to the data of the movement of the imaging device by the moving means, from the first memory means, and corrects the position of said at least one of the optical members such that the position of said at least one the optical members agrees with the read-out position.

5. The imaging apparatus according to claim 1, further comprising image process means for executing a predetermined image process on image data which is obtained by the imaging device, in accordance with the data of the movement of the imaging device by the moving means.

6. The imaging apparatus according to claim 5, wherein the image process, which is executed by the image process means, includes distortion correction.

7. The imaging apparatus according to claim 5, wherein the image process, which is executed by the image process means, includes limb darkening correction.

8. The imaging apparatus according to claim 5, further comprising second memory means for storing parameter values, which are used in the image process that is executed by the image process means, in accordance with the data of the movement of the imaging device by the moving means,
    wherein the image process means executes the image process based on the parameter values stored in the second memory means.

9. The imaging apparatus according to claim 1, wherein the moving means is formed integrally with the imaging device in such a manner as to be movable relative to the imaging device.

10. A camera-shake correction device provided in an imaging apparatus which photographs an image via a plurality of optical members disposed along a photographing optical axis, the camera-shake correction device comprising:
    shake detection means for detecting a direction and an amount of shake;
    moving means for moving an imaging device, which is included in the imaging apparatus, along a plane perpendicular to the photographing optical axis, based on the direction and the amount of shake detected by the shake detection means; and correction means for correcting a position along the photographing optical axis of at least one of the plurality of optical members, in accordance with data of the movement of the imaging device by the moving means.

11. A camera-shake correction method for an imaging apparatus which photographs an image by an imaging device via a plurality of optical members disposed along a photographing optical axis, the method comprising:

detecting a direction and an amount of shake;

moving the imaging device along a plane perpendicular to the photographing optical axis based on the detected direction and amount of shake; and correcting a position along the photographing optical axis of at least one of the plurality of optical members in accordance with data of the movement of the imaging device.

12. A non-transitory computer readable recording medium having stored thereon a program which is executable by a computer of an imaging apparatus including a photographing unit which photographs an image by an imaging device via a plurality of optical members disposed along a photographing optical axis, wherein the program controls the imaging apparatus to perform functions comprising:

detecting a direction and an amount of shake;

moving the imaging device along a plane perpendicular to the photographing optical axis based on the detected direction and amount of shake; and correcting a position along the photographing optical axis of at least one of the plurality of optical members of the photographing unit, in accordance with data of the movement of the imaging device.

* * * * *